US012579282B2

(12) United States Patent
Ji et al.

(10) Patent No.: US 12,579,282 B2
(45) Date of Patent: Mar. 17, 2026

(54) IDENTIFYING VULNERABILITIES IN BINARY FILES USING A CODE SIGNATURE

(71) Applicant: Palo Alto Networks, Inc., Santa Clara, CA (US)

(72) Inventors: Yang Ji, San Jose, CA (US); Dongrui Zeng, Sunnyvale, CA (US); Wenjun Hu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 55 days.

(21) Appl. No.: 18/590,661

(22) Filed: Feb. 28, 2024

(65) Prior Publication Data

US 2025/0272411 A1 Aug. 28, 2025

(51) Int. Cl.
*G06F 21/57* (2013.01)
*G06F 21/56* (2013.01)

(52) U.S. Cl.
CPC .......... *G06F 21/577* (2013.01); *G06F 21/564* (2013.01)

(58) Field of Classification Search
CPC ............................ G06F 21/577; G06F 21/564
See application file for complete search history.

(56) References Cited

U.S. PATENT DOCUMENTS

2019/0018967 A1* 1/2019 Ramasamy ........... G06F 21/577
2020/0134178 A1* 4/2020 Jung ..................... G06F 11/302

FOREIGN PATENT DOCUMENTS

KR 20210098297 A * 8/2021 .......... G06F 11/3604

OTHER PUBLICATIONS

Yang et al., VIVA: Binary Level Vulnerability Identification via Partial Signature, 2021. (Year: 2021).*
Author Unknown, NVD—CVE-2018-1000121 Detail, downloaded Feb. 22, 2024, https://nvd.nist.gov/vuln/detail/CVE-2018-1000121.
Curl, LDAP Null pointer dereference, Mar. 14, 2018.
Iannone et al., The Secret Life of Software Vulnerabilities: A Large-Scale Empirical Study, 2022, pp. 1-20.
Suneja et al., Learning to map source code to software vulnerability using code-as-a-graph, Submitted Oct. 2019, Paper #28, ICST, pp. 1-8.
Xiao et al., MVP: Detecting Vulnerabilities using Patch-Enhanced Vulnerability Signatures, Proceedings of the 29th USENIX Security Symposium, Aug. 12-14, 2020, pp. 1165-1182.
Zhan et al., ATVHunter: Reliable Version Detection of Third-Party Libraries for Vulnerability Identification in Android Applications, Nov. 8, 2021.

* cited by examiner

*Primary Examiner* — Trong H Nguyen
(74) *Attorney, Agent, or Firm* — Van Pelt, Yi & James LLP

(57) ABSTRACT

Techniques for identifying vulnerabilities in binary files using a code signature are disclosed. In some embodiments, a system, a process, and/or a computer program product for identifying vulnerabilities in binary files using a code signature includes collecting a plurality of binary files associated with a vulnerability (e.g., a known vulnerability); determining a function in the plurality of binary files that includes the vulnerability; and automatically generating a code signature (e.g., including wildcarding one or more instructions of the function) for detecting the vulnerability in the plurality of binary files.

20 Claims, 13 Drawing Sheets

Piggybacking on WF static analysis platform

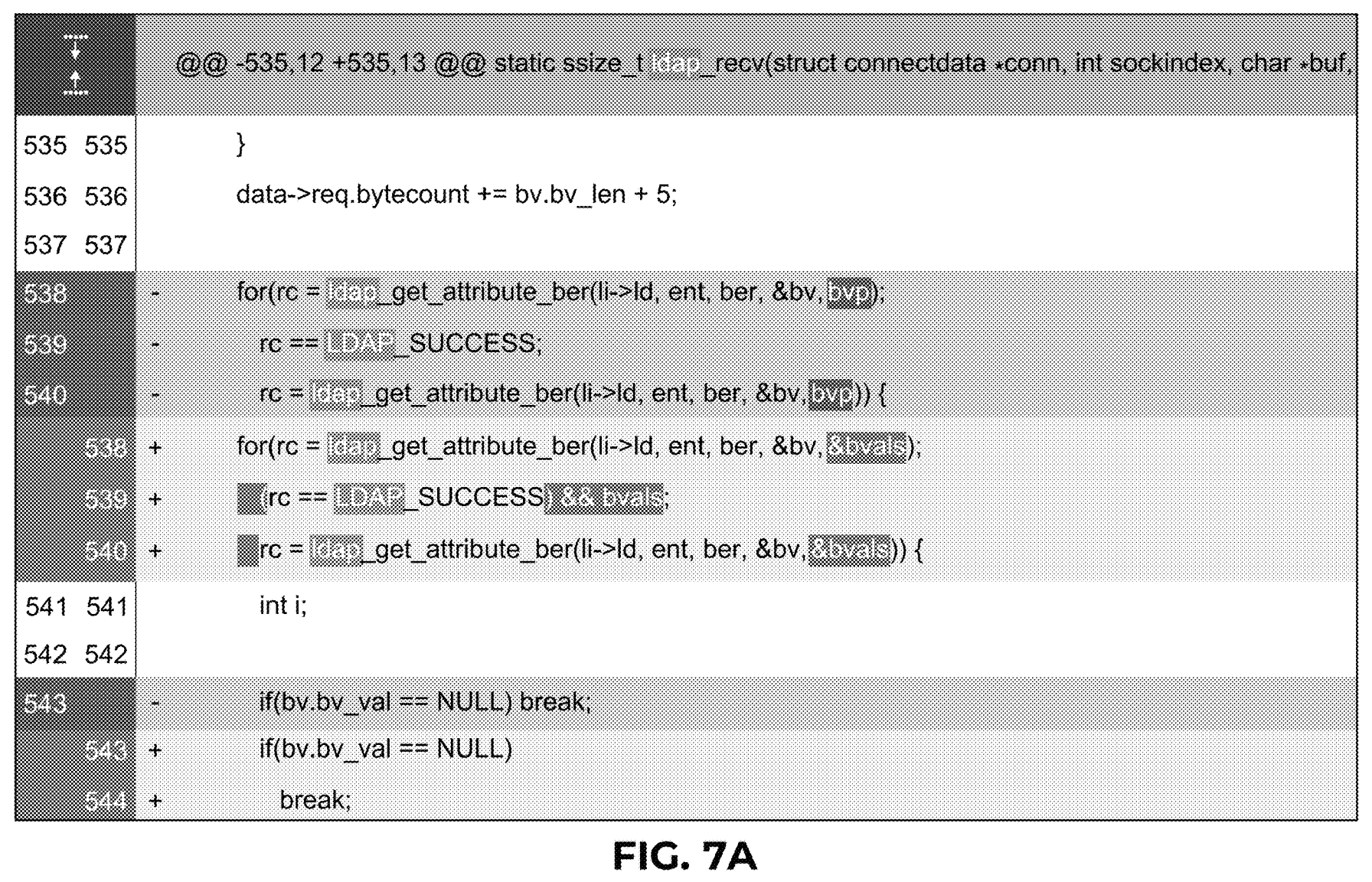

```
@@ -535,12 +535,13 @@ static ssize_t ldap_recv(struct connectdata *conn, int sockindex, char *buf 535   535                }

536   536                data->req.bytecount += bv.bv_len + 5;

537   537
-    538              for(rc = ldap_get_attribute_ber(li->ld, ent, ber, &bv, NULL);
-    539                  rc == LDAP_SUCCESS;
-    540                  rc = ldap_get_attribute_ber(li->ld, ent, ber, &bv, NULL)) {
+    538              for(rc = ldap_get_attribute_ber(li->ld, ent, ber, &bv, &bvals);
+    539                  rc == LDAP_SUCCESS && bvals;
+    540                  rc = ldap_get_attribute_ber(li->ld, ent, ber, &bv, &bvals)) {

541   541                int i;

542   542
-    543              if(bv.bv_val == NULL) break;
+    544              if(bv.bv_val == NULL)
+                        break;
```

FIG. 7A

Disassembly of libcurl.so.4    702

Vulnerable code    704

```
4630d:   48 8b 84 24 90 00 00    mov    0x90(%rsp),%rax
46314:   00
46315:   48 8b 4c 24 30          mov    0x30(%rsp),%rcx
4631a:   4c 89 ee                mov    %r13,%rsi
4631d:   48 8b 54 24 60          mov    0x60(%rsp),%rdx
46322:   49 8b 3e                mov    (%r14),%rdi
46325:   48 83 c0 05             add    $0x5,%rax
46329:   49 01 87 e0 00 00 00    add    %rax,0xe0(%r15)
46330:   48 8d 44 24 68          lea    0x68(%rsp),%rax
46335:   49 89 c0                mov    %rax,%r8
46338:   48 89 44 24 38          mov    %rax,0x38(%rsp)
4633d:   e8 de 5d fc ff          callq  c120 <ldap_get_attribute_ber@plt>
46342:   85 c0                   test   %eax,%eax
46344:   0f 85 ae 03 00 00       jne    466f8 <curl_slist_free_all@@CURL_OPENSSL_4+0x8028>
```

FIG. 7B

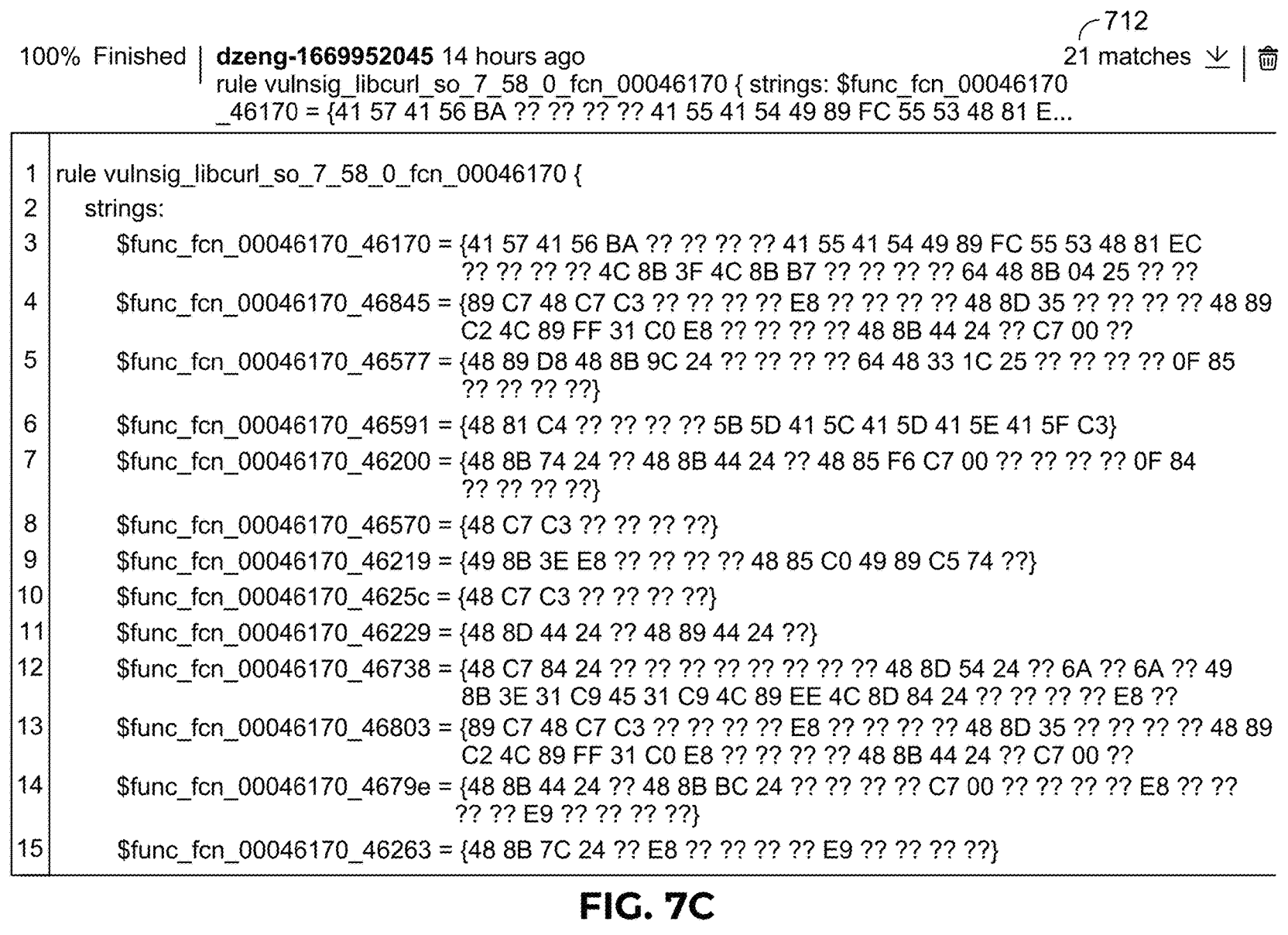

100% Finished | dzeng-1669952045 14 hours ago

712

21 matches 1    rule vulnsig_libcurl_so_7_58_0_fcn_00046170 { strings: $func_fcn_00046170_46170 = {41 57 41 56 BA ?? ?? ?? ?? 41 55 41 54 49 89 FC 55 53 48 81 E...

2    rule vulnsig_libcurl_so_7_58_0_fcn_00046170 {

2    strings:

3    $func_fcn_00046170_46170 = {41 57 41 56 BA ?? ?? ?? ?? 41 55 41 54 49 89 FC 55 53 48 81 EC ?? ?? ?? 4C 8B 3F 4C 8B B7 ?? ?? ?? ?? 64 48 8B 04 25 ?? ??

4    $func_fcn_00046170_46845 = {89 C7 48 C7 C3 ?? ?? ?? ?? E8 ?? ?? ?? ?? 48 8D 35 ?? ?? ?? ?? 48 89 C2 4C 89 FF 31 C0 E8 ?? ?? ?? ?? 48 8B 44 24 ?? C7 00 ??

5    $func_fcn_00046170_46577 = {48 89 D8 48 8B 9C 24 ?? ?? ?? ?? 64 48 33 1C 25 ?? ?? ?? ?? 0F 85 ?? ?? ?? ??}

6    $func_fcn_00046170_46591 = {48 81 C4 ?? ?? ?? ?? 5B 5D 41 5C 41 5D 41 5E 41 5F C3}

7    $func_fcn_00046170_46200 = {48 8B 74 24 ?? 48 8B 44 24 ?? 48 85 F6 C7 00 ?? ?? ?? ?? 0F 84 ?? ?? ?? ??}

8    $func_fcn_00046170_46570 = {48 C7 C3 ?? ?? ?? ??}

9    $func_fcn_00046170_46219 = {49 8B 3E E8 ?? ?? ?? ?? 48 85 C0 49 89 C5 74 ??}

10   $func_fcn_00046170_4625c = {48 C7 C3 ?? ?? ?? ??}

11   $func_fcn_00046170_46229 = {48 8D 44 24 ?? 48 89 44 24 ??}

12   $func_fcn_00046170_46738 = {48 C7 84 24 ?? ?? ?? ?? 48 8D 54 24 ?? 6A ?? 6A ?? 49 8B 3E 31 C9 45 31 C9 4C 89 EE 4C 8D 84 24 ?? ?? ?? ?? E8 ??

13   $func_fcn_00046170_46803 = {89 C7 48 C7 C3 ?? ?? ?? ?? E8 ?? ?? ?? ?? 48 8D 35 ?? ?? ?? ?? 48 89 C2 4C 89 FF 31 C0 E8 ?? ?? ?? ?? 48 8B 44 24 ?? C7 00 ??

14   $func_fcn_00046170_4679e = {48 8B 44 24 ?? 48 8B BC 24 ?? ?? ?? ?? C7 00 ?? ?? ?? ?? E8 ?? ?? ?? ?? E9 ?? ?? ?? ??}

15   $func_fcn_00046170_46263 = {48 8B 7C 24 ?? E8 ?? ?? ?? ?? E9 ?? ?? ?? ??}

FIG. 7C

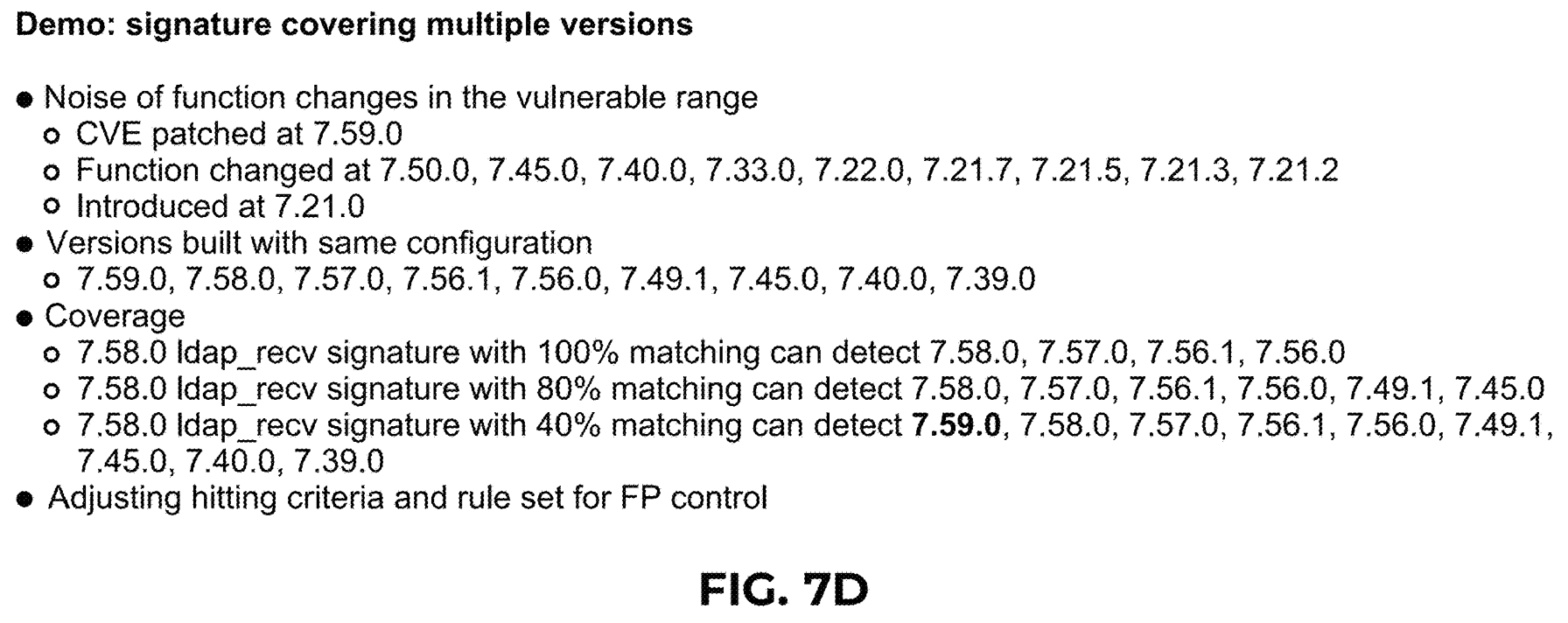

Demo: signature covering multiple versions

- Noise of function changes in the vulnerable range
  - CVE patched at 7.59.0
  - Function changed at 7.50.0, 7.45.0, 7.40.0, 7.33.0, 7.22.0, 7.21.7, 7.21.5, 7.21.3, 7.21.2
  - Introduced at 7.21.0
- Versions built with same configuration
  - 7.59.0, 7.58.0, 7.57.0, 7.56.1, 7.56.0, 7.49.1, 7.45.0, 7.40.0, 7.39.0
- Coverage
  - 7.58.0 ldap_recv signature with 100% matching can detect 7.58.0, 7.57.0, 7.56.1, 7.56.0
  - 7.58.0 ldap_recv signature with 80% matching can detect 7.58.0, 7.57.0, 7.56.1, 7.56.0, 7.49.1, 7.45.0
  - 7.58.0 ldap_recv signature with 40% matching can detect 7.59.0, 7.58.0, 7.57.0, 7.56.1, 7.56.0, 7.49.1, 7.45.0, 7.40.0, 7.39.0
- Adjusting hitting criteria and rule set for FP control

FIG. 7D

802 — Collect a plurality of binary files associated with a known vulnerability.

804 — Determine a function in the binary files that includes the vulnerability.

806 — Automatically generate a code signature for detecting the vulnerability in the binary files.

902 —

Collect a plurality of binary files associated
with a vulnerability.

904 —

Determine a function in the binary files that includes
the vulnerability.

906 —

Automatically generate a code signature for detecting the
vulnerability in the binary files.

908 —

Apply the code signature using a security solution to
detect a binary file that includes the vulnerability.

IDENTIFYING VULNERABILITIES IN BINARY FILES USING A CODE SIGNATURE

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 7A illustrates an example detection of CVE-2018_1000121 in libcurl in accordance with some embodiments.

FIG. 7B illustrates an example code signature generation for automated detection of CVE-2018_1000121 in libcurl in accordance with some embodiments.

FIG. 7C illustrates a validation of the example code signature generated for automated detection of CVE-2018_1000121 in libcurl in accordance with some embodiments.

FIG. 7D illustrates a validation of the example code signature generated for automated detection of CVE-2018_1000121 in libcurl that covers multiple versions of the libcurl software in accordance with some embodiments.

DETAILED DESCRIPTION

Figure 1:
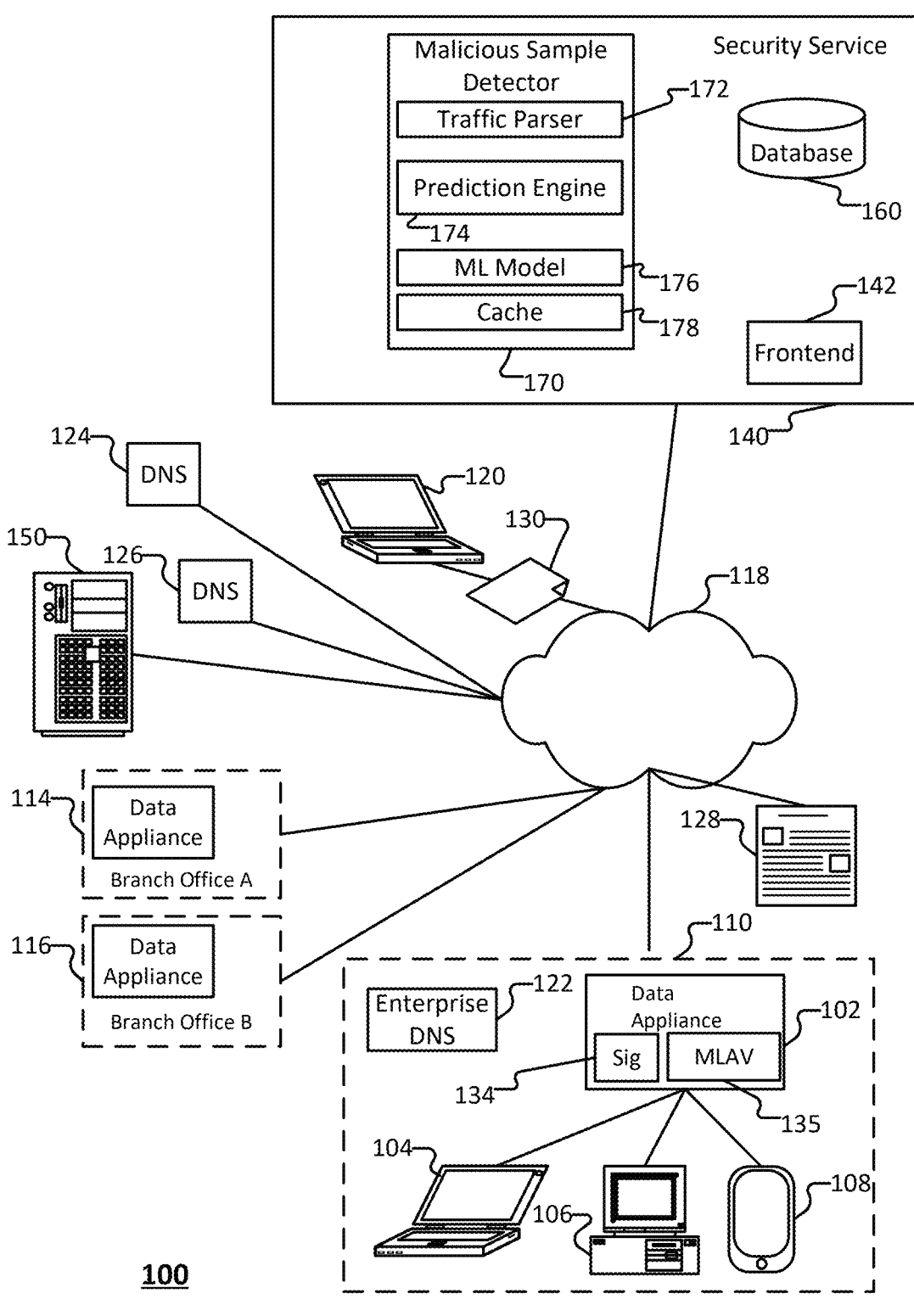
FIG. 1 is a block diagram of an environment in which malicious traffic is detected or suspected in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all these specific details. For the purpose of clarity, technical material that is known in the technical fields related to the invention has not been described in detail so that the invention is not unnecessarily obscured.

Technical Challenges for Identifying Vulnerabilities in Software

Generally, executable files and/or library files (e.g., programs and applications, such as those executed on a computer, laptop, smart phone, Internet of Things (IoT) device, etc.) can often contain vulnerabilities (e.g., stack overflow or other vulnerabilities that can be exploited by malware crafted to exploit a known vulnerability) due to software coding errors (e.g., bugs).

Significant security incidents have recently been due to vulnerabilities in the software supply chain (e.g., Solar-Winds, Log 4j, etc.).

Numerous known vulnerabilities are in customers' networks and systems, such as 62% of attacks rely on malware; 66% of attacks focus on supplier's code; and 96% of third party container applications contain known vulnerabilities.

However, there exists significant technical challenges for identifying vulnerabilities in software.

Generally, identification of vulnerabilities in software typically depends on meta data, including manifest information available at the development or build systems and runtime environment.

For example, conventional vulnerability discovery approaches typically rely on software package management tools (e.g., dpkg in Ubuntu and/or other commercially/open source available software package management tools), build time information, and/or source code to identify the software version and determine which vulnerabilities the version is known to have. However, such approaches can often have visibility limitations on individual executable files that have not been installed or its source/build system access is not available.

As such, it can be technically difficult to identify vulnerabilities in software (e.g., executable binary file(s)) if such is taken out of the above context (e.g., development or build system context/environment).

Further, such generic files without context commonly exist, such as when they are transferred (e.g., downloaded via network traffic) and/or stored in a computer storage medium (e.g., stored in a file system on a computer hard drive, such as an app downloaded and stored on a smart phone or other computing device).

Moreover, even though a skilled developer/programmer can often identify bugs in a binary file (e.g., a computer program file), it is often technically challenging to detect bugs existing in third-party libraries that had been previously built into the binary/executable file.

Thus, new and improved techniques are needed for identifying vulnerabilities in software.

Overview of Techniques for Identifying Vulnerabilities in Binary Files Using a Code Signature Accordingly, new and improved techniques for identifying vulnerabilities in binary files using a code signature are disclosed.

For example, various techniques are disclosed that facilitate an effective and efficient identification of vulnerabilities (if any) contained in a binary file using a code signature (e.g., a static signature) matching on the vulnerable code in the binary file. Specifically, the disclosed techniques can detect vulnerabilities in binary files, only based on the information contained in the file (e.g., without requiring the additional development or build system context/environment).

One approach is to rely on fingerprints in the binary file (e.g., a version number directly embedded in the file) related to software versions. However, this approach is limited sometimes as such fingerprints may not exist in a given binary file. As such and as will be further described below, the disclosed techniques can identify the vulnerabilities by the presence of their related bugs in the binary code.

In some embodiments, a system, a process, and/or a computer program product for identifying vulnerabilities in binary files using a code signature includes collecting a plurality of binary files associated with a vulnerability (e.g., a known vulnerability); determining a function in the binary files that includes the vulnerability; and automatically generating a code signature (e.g., including wildcarding one or more instructions of the function) for detecting the vulnerability in the binary files.

In some embodiments, a system, a process, and/or a computer program product for identifying vulnerabilities in binary files using a code signature includes applying the code signature using a security solution for detecting the vulnerability; and performing an action in response to a match with another binary file with the code signature based on a security policy.

For example, the disclosed techniques can be applied to determine any known bugs or vulnerabilities a given binary file contains without the source or compile-time level information about what software and which version are used, such as will be further described below. In an example implementation, the disclosed techniques facilitate identifying the vulnerabilities contained in a binary file efficiently (e.g., similar to a static signature matching on the vulnerable code).

As such, the disclosed techniques can effectively and efficiently be applied directly on the target binary file, without dependence on the software build system or package manager. Thus, the disclosed techniques provide a more flexible and versatile vulnerability detection solution compared with conventional vulnerability scanning approaches as similarly discussed above. For example, disclosed techniques can be applied at firewalls, endpoint protection, and/or cloud-based security solutions (e.g., a cloud-based scanner, etc.).

Moreover, the use of rule-based signature matching provides an efficient detection runtime solution.

Further, the disclosed techniques that can include wild-carding of instructions reduce the noise from compiling polymorphism. As such, a single signature rule can often detect multiple versions of the software containing a given vulnerability.

These and other aspects and embodiments for identifying vulnerabilities in binary files using a code signature will now be further described below.

System Embodiments for Identifying Vulnerabilities in Binary Files Using a Code Signature FIG. 1 is a block diagram of an environment in which malicious traffic is detected or suspected in accordance with some embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is a security platform, also referred to herein as an inline security entity. Data appliance 102 performs low-latency processing/analysis of incoming data (e.g., traffic data) and determines whether to offload any processing of the incoming data to a cloud system, such as security service 140 (e.g., which includes a frontend 142, such as for communications with security platforms, such as data appliance 102, etc.).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security service 140 (e.g., a cloud-based security service, also referred to as a cloud service or a cloud security service). Security service 140 may be a cloud system such as a cloud service security entity. Security service 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security service 140 comprises one or more dedicated commercially available hardware servers (e.g., having multi-core processor(s), 32G+ of RAM, gigabit network interface adaptor(s), and hard drive (s)) running typical server-class operating systems (e.g., Linux). Security service 140 can be implemented across a scalable infrastructure comprising multiple such servers, solid state drives, and/or other applicable high-performance hardware. Security service 140 can comprise several distributed components, including components provided by one or more third parties. For example, portions or all of security service 140 can be implemented using the Amazon Elastic Compute Cloud (EC2) and/or Amazon Simple Storage Service (S3). Further, as with data appliance 102, whenever security service 140 is referred to as performing a task, such as storing data or processing data, it is to be understood that a sub-component or multiple sub-components of security service 140 (whether individually or in cooperation with third party components) may cooperate to perform that task. As one example, security service 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix Xen-Server, or Microsoft Hyper-V. In some embodiments, the virtual machine server is omitted. Further, a virtual machine server may be under the control of the same entity that administers security service 140 but may also be provided by a third party. As one example, the virtual machine server can rely on EC2, with the remainder portions of security service 140 provided by dedicated hardware owned by and under the control of the operator of security service 140.

In some embodiments, system 100 (e.g., malicious sample detector 170, security service 140, etc.) trains a detection model to detect exploits (e.g., malicious samples), malicious traffic, and/or other malicious/nefarious/undesirable activity/behavior, etc. Security service 140 may store block lists, allowed lists, etc. with respect to data (e.g., mappings of signatures to malicious files, etc.). In response to processing traffic data, security service 140 may send an update to inline security entities, such as data appliance 102. For example, security service 140 provides an update to a mapping of signatures to malicious files, an update to a mapping of signatures to benign files, etc.

According to various embodiments, the model(s) trained by system 100 (e.g., security service 140) are obtained using a machine learning process (e.g., implementing various machine learning techniques (MLT)). Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) are a combined feature vector or set of feature vectors and based on the combined feature vector or set of feature vectors the classifier model determines whether the corresponding traffic (e.g., input string) is malicious, or a likelihood that the traffic is malicious (e.g., whether the traffic is exploit traffic).

According to various embodiments, security service 140 includes a malicious sample detector 170. Malicious sample detector 170 is used in connection with determining whether a sample (e.g., traffic data) is malicious. In response to receiving a sample (e.g., an input string such as an input string input in connection with a log-in attempt), malicious sample detector 170 analyzes the sample (e.g., the input string), and determines whether the sample is malicious. For example, malicious sample detector 170 determines one or more feature vectors for the sample (e.g., a combined feature vector), and uses a model to determine (e.g., predict) whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, ML model 176, and/or cache 178.

Traffic parser 172 is used in connection with determining (e.g., isolating) one or more attributes associated with a sample being analyzed. As an example, in the case of a file, traffic parser 172 can parse/extract information from the file, such as from a header of the file. The information obtained from the file may include libraries, functions, or files invoked/called by the file being analyzed, an order of calls, etc. As another example, in the case of an input string, traffic parser 172 determines sets of alphanumeric characters or values associated with the input string. In some embodiments, traffic parser 172 obtains one or more attributes associated with (e.g., from) the input string. For example, traffic parser 172 obtains from the input string one or more patterns (e.g., a pattern of alphanumeric characters), one or more sets of alphanumeric characters, one or more commands, one or more pointers or links, one or more IP addresses, etc.

In some embodiments, one or more feature vectors corresponding to the input string are determined by malicious sample detector 170 (e.g., traffic parser 172 or prediction engine 174). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, traffic parser 172 uses the one or more attributes associated with the sample in connection with determining the one or more feature vectors. In some implementations, traffic parser 172 determines a combined feature vector based at least in part on the one or more feature vectors corresponding to the sample. As an example, a set of one or more feature vectors is determined (e.g., set or defined) based at least in part on the model used to detect exploits. Malicious sample detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from files, or SQL and command injection strings, and (ii) using an algorithmic-based feature extraction to filter out described features from a set of raw input data.

In response to receiving a sample for which malicious sample detector 170 is to determine whether the sample is malicious (or a likelihood that the sample is malicious), malicious sample detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious sample detector 170 (e.g., traffic parser 172) provides (or makes accessible) the one or more feature vectors to prediction engine 174 (e.g., in connection with obtaining a prediction of whether the sample is malicious). As another example, malicious sample detector 170 (e.g., traffic parser 172) stores the one or more feature vectors such as in cache 178 or database 160.

In some embodiments, prediction engine 174 determines whether the sample is malicious based at least in part on one or more of (i) a mapping of samples to indications of whether the corresponding samples are malicious, (ii) a mapping of an identifier for a sample (e.g., a hash or other signature associated with the sample) to indications of whether the corresponding sample is malicious, and/or (iii) a classifier (e.g., a model trained using a machine learning process). In some embodiments, determining whether the sample based on identifiers to indications that the sample is malicious may be performed at data appliance 102, and for a sample for which an associated identifier is not stored in the mapping(s), data appliance 102 offloads processing of the sample to security service 140.

Prediction engine 174 is used to predict whether a sample is malicious. In some embodiments, prediction engine 174 determines (e.g., predicts) whether a received sample is malicious. According to various embodiments, prediction engine 174 determines whether a newly received sample is malicious based at least in part on characteristics/attributes pertaining to the sample (e.g., regex statements, information obtained from a file header, calls to libraries, APIs, etc.). For example, prediction engine 174 applies a machine learning model to determine whether the newly received sample is malicious. Applying the machine learning model to determine whether the sample is malicious may include prediction engine 174 querying machine learning model 176 (e.g., with information pertaining to the sample, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular sample is malicious. In some embodiments, prediction engine 174 receives information associated with whether the sample is malicious (e.g., an indication that the sample is malicious). For example, prediction engine 174 receives a result of a determination or analysis by machine learning model 176. In some embodiments, prediction engine 174 receives from machine learning model 176 an indication of a likelihood that the sample is malicious. In response to receiving the indication of the likelihood that the sample is malicious, prediction engine 174 determines (e.g., predicts) whether the sample is malicious based at least in part on the likelihood that the sample is malicious. For example, prediction engine 174 compares the likelihood that the sample is malicious to a likelihood threshold value. In response to a determination that the likelihood that the sample is malicious is greater than a likelihood threshold value, prediction engine 174 may deem (e.g., determine that) the sample to be malicious.

According to various embodiments, in response to prediction engine 174 determining that the received sample is malicious, security service 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a block list of samples (e.g., corresponding to malicious samples) such as in the case that the received sample is deemed to be malicious, or an update to an allowed list of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for a sample and perform a look up against a mapping of hashes/signatures to indications of whether samples are malicious/benign (e.g., query an allow list and/or a block list). In some embodiments, the hash or signature uniquely identifies the sample.

Prediction engine 174 is used in connection with determining whether the sample (e.g., an input string) is malicious (e.g., determining a likelihood or prediction of whether the sample is malicious). Prediction engine 174 uses information pertaining to the sample (e.g., one or more attributes, patterns, etc.) in connection with determining whether the corresponding sample is malicious.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a block list, an allow list, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical input strings and historical information, malicious sample detector 170 may deem the sample has not yet been analyzed and malicious sample detector 170 can invoke an analysis (e.g., a dynamic analysis) of the sample in connection with determining (e.g., predicting) whether the sample is malicious (e.g., malicious sample detector 170 can query a classifier based on the sample in connection with determining whether the sample is malicious). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on an allow list or block list, etc.). Malicious sample detector 170 (e.g., traffic parser 172) may detect that a sample is newly analyzed in response to security service 140 receiving the sample from a security entity (e.g., a firewall) or endpoint within a network. For example, malicious sample detector 170 determines that a sample is newly analyzed contemporaneous with receipt of the sample by security service 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to query a classifier to analyze the sample or one or more feature vectors associated with the sample, etc.) in connection with determining whether the sample is malicious, and malicious sample detector 170 uses a classifier with respect to a set of feature vectors or a combined feature vector associated with characteristics or relationships of attributes or characteristics in the sample.

Machine learning model 176 predicts whether a sample (e.g., a newly received sample) is malicious based at least in part on a model. As an example, the model is pre-stored and/or pre-trained. The model can be trained using various machine learning processes. According to various embodiments, machine learning model 176 uses a relationship and/or pattern of attributes and/or characteristics, relationships among attributes or characteristics for the sample, and/or a training set to estimate whether the sample is malicious, such as to predict a likelihood that the sample is malicious. For example, machine learning model 176 uses a machine learning process to analyze a set of relationships between an indication of whether a sample is malicious (or benign), and one or more attributes pertaining to the sample and uses the set of relationships to generate a prediction model for predicting whether a particular sample is malicious. In some embodiments, in response to predicting that a particular sample is malicious, an association between the sample and the indication that the sample is malicious is stored such as at malicious sample detector 170 (e.g., cache 178). In some embodiments, in response to predicting a likelihood that a particular sample is malicious, an association between the sample and the likelihood that the sample is malicious is stored such as at malicious sample detector 170 (e.g., cache 178). Machine learning model 176 may provide the indication of whether a sample is malicious, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

Cache 178 stores information pertaining to a sample (e.g., an input string). In some embodiments, cache 178 stores mappings of indications of whether an input string is malicious (or likely malicious) to particular input strings, or mappings of indications of whether a sample is malicious (or likely malicious) to hashes or signatures corresponding to samples. Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104, will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjgfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security service 140.

In various embodiments, data appliance 102 includes signatures 134 (e.g., periodically updated from security service 140) and an inline machine learning antivirus (MLAV) module 135, which is configured to facilitate ML-based malware detection (e.g., the MLAV model component can be implemented as further described in U.S. Pat. Nos. 11,374,946 and 11,636,208, which are both incorporated herein by reference in their entirety). Using processing described in more detail below, security service 140 will determine (e.g., using a malicious file detector that may be similar to malicious sample detector 170 such as by using a machine learning model to detect/predict whether the file is malicious) whether a sample (e.g., a file) is a malicious file (or likely to be a malicious file) and provide a result back to data appliance 102 (e.g., "malicious file" or "benign file").

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and the data appliance may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

Figure 2A:
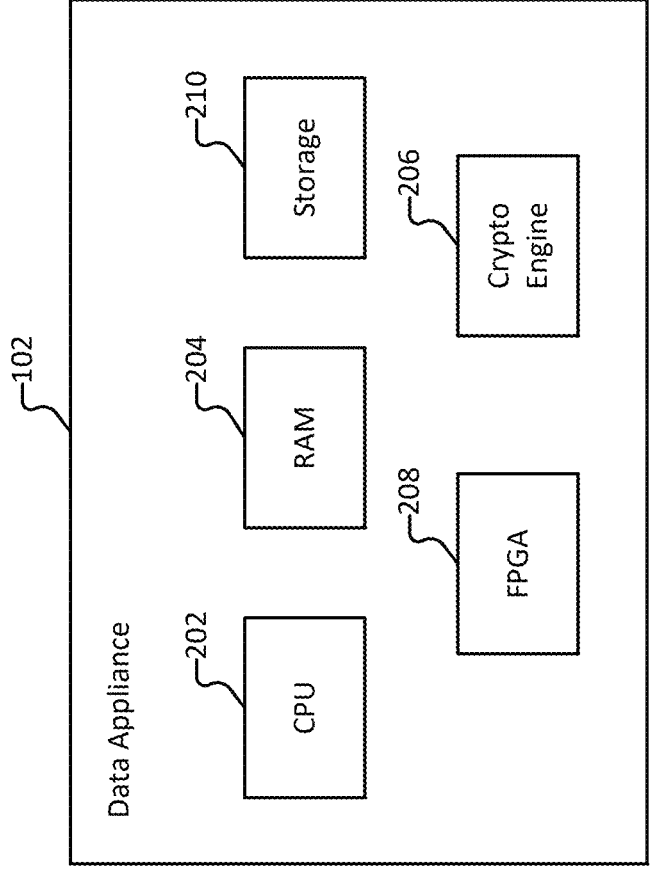
FIG. 2A illustrates an embodiment of a data appliance.

FIG. 2A illustrates an embodiment of a data appliance. An embodiment of an inline security entity, such as data appliance 102, is shown in FIG. 2A. The example shown is a representation of physical components that are included in data appliance 102, in various embodiments. Specifically, data appliance 102 includes a high-performance multi-core Central Processing Unit (CPU) 202 and Random Access Memory (RAM) 204. Data appliance 102 also includes a storage 210 (such as one or more hard disks or solid-state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general-purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
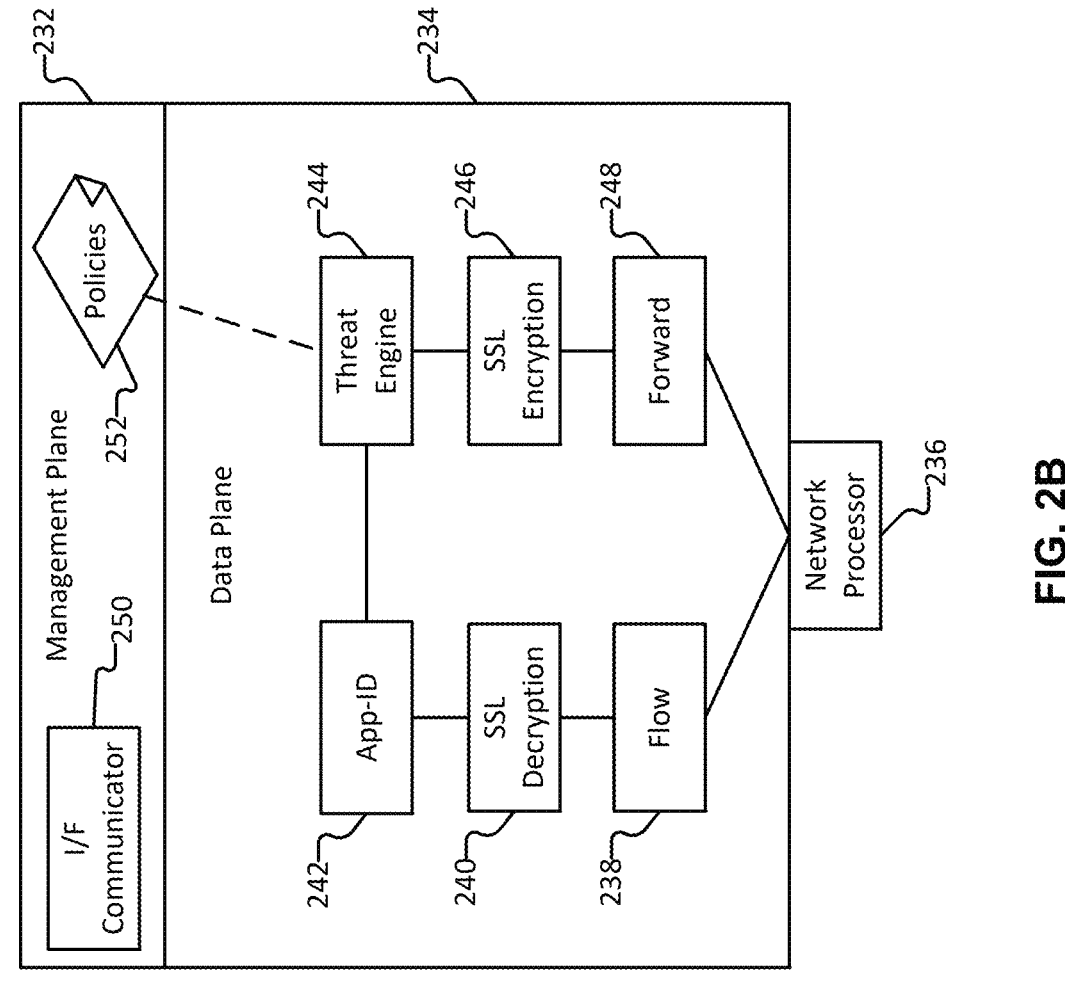
FIG. 2B is a functional diagram of logical components of an embodiment of a data appliance.

FIG. 2B is a functional diagram of logical components of an embodiment of a data appliance. The example shown is a representation of logical components that can be included in an inline security appliance, such as data appliance 102, in various embodiments. Unless otherwise specified, various logical components of data appliance 102 are generally implementable in a variety of ways, including as a set of one or more scripts (e.g., written in Go, Java, Python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling. The data plane may be further responsible for offloading processing to a cloud system/service, such as by communicating a request message to the cloud system/service without mediation or forwarding the message through the management plane, such as further described herein.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

Identifying Vulnerabilities in Binary Files Using a Code Signature

Various system embodiments for identifying vulnerabilities in binary files using a code signature are disclosed.

Figure 3:
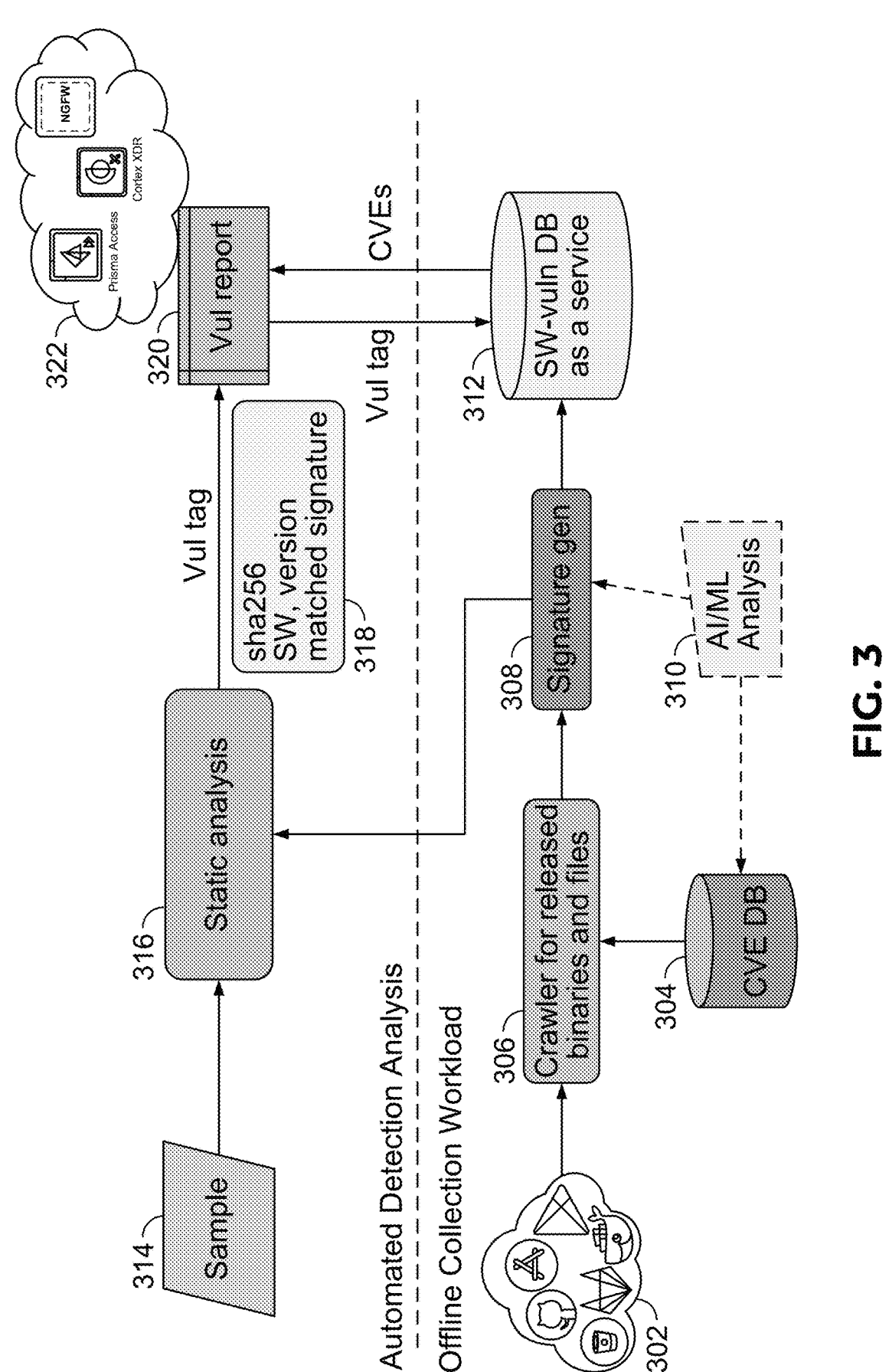
FIG. 3 illustrates an overview of an architecture for identifying vulnerabilities in binary files using a code signature in accordance with some embodiments.

FIG. 3 illustrates an overview of an architecture for identifying vulnerabilities in binary files using a code signature in accordance with some embodiments.

Referring to the offline collection workload section shown in FIG. 3, an offload collection workload architecture includes a crawler for various released binaries and files 302 (e.g., apps, such as available via the Apple app store and/or the Android app store, Open Source Software (OSS) available from GitHub and/or other OSS repositories, etc.). A Common Vulnerabilities and Exposures (CVE) database 304 is a data store of publicly disclosed information security issues (e.g., a CVE number uniquely identifies one vulnerability from the list) that is used as a source of known vulnerabilities that is provided as input to a crawler 306.

In this example implementation, the crawler is configured to periodically collect target binary files related to a given vulnerability (e.g., for each vulnerability in CVE DB 304). Generally, this involves determining a version range of the software related to the CVE including the one that patched the vulnerability. The desired target binary files associated with the versions are then crawled. Example binary file types can include Java, Python, native libraries/programs, .net, JavaScript, and/or other binary file types.

At 308, the signature generation processing is performed using a signature generation component 308. Specifically, the input for the signature generation processing includes a binary file with a known vulnerability and associated meta information (e.g., a CVE, bug report). On each file, a disassembling operation is performed on the binary file to determine the function boundaries. The function containing the bug is then located. For example, this operation can be implemented by performing a binary diff (between the patched version and the vulnerable version(s) e.g., comparing the two respective binary files to identify any differences) and pinpointing the function that includes the vulnerability (e.g., software bug). Optionally, a wildcard operation can be performed to generalize the to be generated binary code signature for the vulnerability. Specifically, a wildcard of each instruction of the function that includes the vulnerability is added such that each basic block of wild-carded instructions forms a byte string. The wildcarding of instructions reduces the noise from compiling polymorphism, so that a single signature rule is able to detect multiple versions of the SW containing the vulnerability.

Finally, a rule-based signature (e.g., a Yet Another Recursive Acronym (YARA) rule) with the wildcarded byte strings, each as a condition, is automatically generated to provide the code signature for automatically identifying binary files with the vulnerability. As shown at 310, AI/ML analysis can also be used to facilitate the vulnerability selection at 304 and/or the signature generation processing to enhance the efficacy and efficiency of the automatically generated signature generation operation at 308.

Next, the code signature for automatically identifying binary files with the vulnerability is provided to a software-vulnerability database as a service as shown at 312. The software-vulnerability database as a service is in communication with a vulnerability report generating service as shown at 320 as will be further described below.

Referring now to the automated detection analysis section shown in FIG. 3, an automated detection analysis architecture includes receiving as input a sample (e.g., a binary file) as shown at 314.

At 316, a static analysis of the sample is automatically performed. Specifically, the binary file is scanned using the static signatures that include the code signatures for automatically identifying binary files with a vulnerability (from 312).

At 318, a match with a given code signature indicates which vulnerabilities the file contains as shown. In this example implementation, a hash of the binary file (e.g., SHA256 or another hash function can be used to generate the hash of the binary file), software and version information associated with the binary file, and the matched code signature are generated as a vulnerability tag that is then provided as input to a vulnerability report as shown at 320.

The vulnerability tag is then provided as input to software-vulnerability database as a service 312.

At 322, the vulnerability report can then be shared with various security products/services. Example security products/services include cloud-based security services (e.g., Prisma Access® available from Palo Alto Networks, Inc. headquartered in Santa Clara, California or using other cloud-based security services), cloud-based security information data stores (e.g., Cortex® XDR™ available from Palo Alto Networks, Inc. headquartered in Santa Clara, California or using cloud-based security information data stores), and a firewall, such as an NGFW.

As such, the disclosed techniques include an effective and efficient solution that automatically disassembles each binary file, locates the vulnerable function(s), optionally performs wildcarding on the automatically identified relevant byte string(s), and then automatically generates a code signature for automatically identifying binary files with the vulnerability.

As such, the disclosed techniques for identifying vulnerabilities in binary files using a code signature facilitates automatically performing vulnerability detection on generic binary files.

In addition, using the above-described optional wildcard techniques, the solution facilitates enhanced coverage on all versions of the software containing the same bug/vulnerability.

For example, the disclosed techniques for identifying vulnerabilities in binary files using a code signature can be applied to provide an effective and efficient network-based vulnerability management solution with file-level detection capability of such vulnerabilities (e.g., using a cloud-based security service).

As another example, the disclosed techniques for identifying vulnerabilities in binary files using a code signature can be applied to provide an effective and efficient inline detection solution with file-level detection capability of such vulnerabilities (e.g., using an NFGW).

Moreover, the disclosed techniques for identifying vulnerabilities in binary files using a code signature can be applied to provide flexible and tunable rules that allow flexibility for false positive (FP) and coverage improvement.

Figure 4:
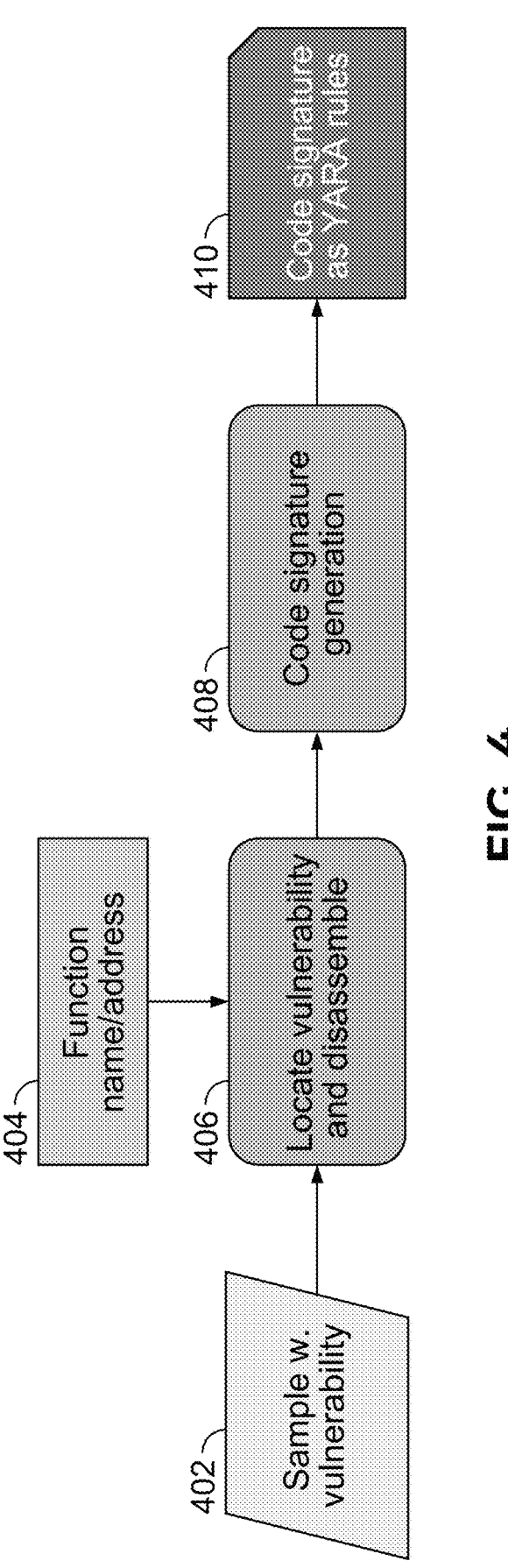
FIG. 4 illustrates a component diagram for generating a code signature as an indicator of vulnerability in accordance with some embodiments.

FIG. 4 illustrates a component diagram for generating a code signature as an indicator of vulnerability in accordance with some embodiments. Specifically, FIG. 4 illustrates a component diagram for generating a code signature as an indicator of vulnerability using a C/C++ binary file as an example.

Referring to FIG. 4, a sample (e.g., a binary with one or more vulnerabilities) as shown at 402 and a vulnerable function name/address 404 are provided as input.

A function boundary locator component as shown at 406 is configured to automatically determine a location of a function boundary (e.g., based on the function name/address input) in the sample. As a first example implementation, the function boundary locator component can be configured to search the input function name in a symbol table and disassemble the binary file to determine the location of a function boundary in the sample. As a second example implementation, the function boundary locator component can be configured to disassemble the binary file starting from the input function address to determine the location of a function boundary in the sample.

A code signature generation component 408 receives the results from the function boundary locator component as input that is used for automatically generating a code signature that can be applied for identification of the vulnerable function in binary files (e.g., other samples). In an example implementation, the code signature generation component is configured to include wildcarding constants in each instruction byte encoding. Specifically, each basic block forms a wildcarded byte string. All wildcarded byte strings make up the string section of the YARA rule. The condition is a threshold of 80% of the defined strings (e.g., the percentage is configurable such that or another threshold value can be used).

At 410, a code signature (e.g., in the format of a YARA signature and/or another format can similarly be used) that can be applied for identification of the vulnerable function in binary files (e.g., other samples) is generated as output. As similarly described above, the code signature can be applied by various security products/services to facilitate enhanced detection of binary files with vulnerabilities.

Figure 5:
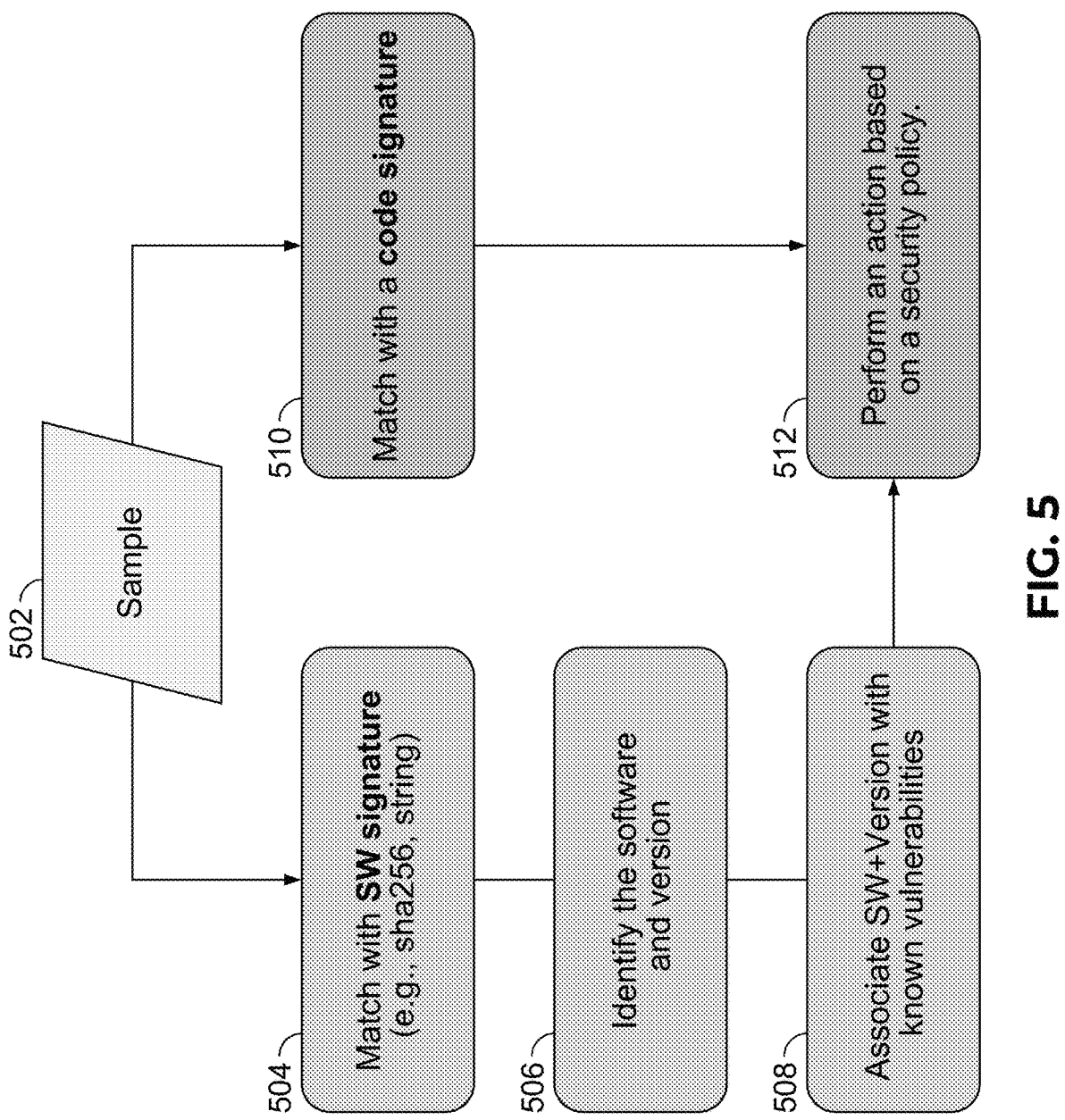
FIG. 5 illustrates a component diagram for applying a code signature for automated detection of a binary file with a vulnerability in accordance with some embodiments.

FIG. 5 illustrates a component diagram for applying a code signature for automated detection of a binary file with a vulnerability in accordance with some embodiments. Specifically, FIG. 5 illustrates an example of detecting binary files with vulnerabilities using the above-described code signatures.

Referring to FIG. 5, a sample (e.g., a binary with one or more vulnerabilities) as shown at 502 is provided as input.

At 504, a software (SW) signature match is performed. For example, the SW signature can be implemented as a hash (e.g., using a SHA256 or other hash function for uniquely identifying previously identified binary files/programs/software files/libraries, etc.) or another string format can similarly be used to attempt to uniquely identify such content.

At 506, if there is a match with a predefined SF signature, then the software and version number can be successfully identified and processing proceeds to 508. Otherwise, processing proceeds to 510.

At 508, the software and version number can be associated with any known vulnerabilities and processing proceeds to 512.

At 510, a code signature match is performed. For example, the code signatures that are applied can be generated as similarly described above with respect to FIGS. 3 and 4. If there is a code signature match, then processing proceeds to 512.

At 512, if the software and version number can be associated with any known vulnerabilities at 508 and/or if there was a successful code signature match at 510, then an action is performed based on a security policy. For example, the security policy can include a rule(s) to perform an action in response to detection of a sample that includes a vulnerability, such as to generate an alert, report, block the sample, quarantine the sample/device associated with the sample, and/or other responsive actions can similarly be performed.

Figure 6:
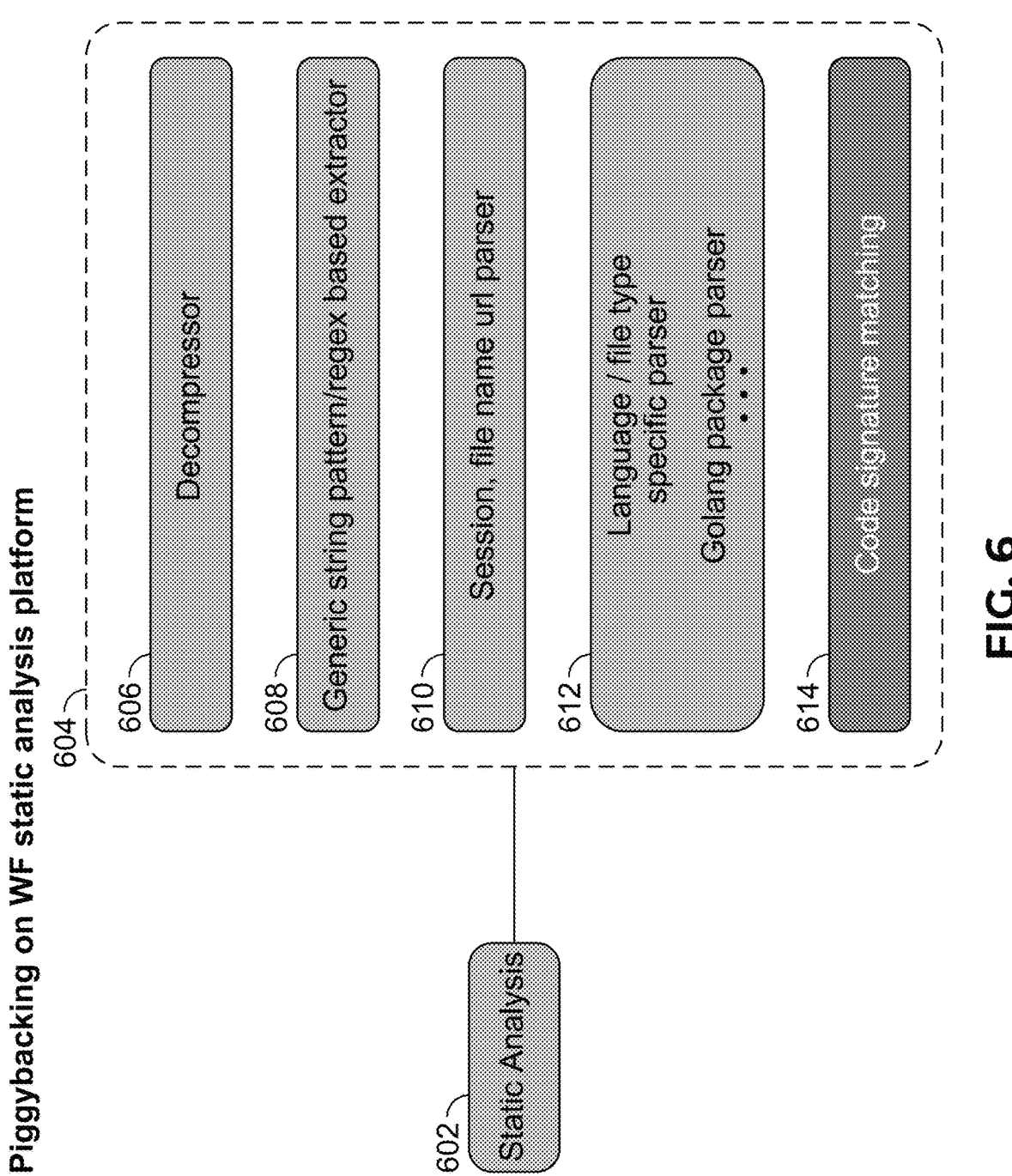
FIG. 6 illustrates a component diagram of a security solution for performing a static analysis of samples and applying a code signature for automated detection of a binary file with a vulnerability in accordance with some embodiments.

FIG. 6 illustrates a component diagram of a security solution for performing a static analysis of samples and applying a code signature for automated detection of a binary file with a vulnerability in accordance with some embodiments. Specifically, FIG. 6 illustrates another example of detecting binary files with vulnerabilities using the above-described code signatures.

Referring to FIG. 6, a static analysis of samples is performed at 602. For example, the static analysis can be performed using a security solution (e.g., at an NGFW solution and/or a cloud-based security solution/service) for detecting malware, including detecting binary files with known vulnerabilities.

The results of the static analysis 604 are provided to a static analysis platform as shown at 604.

At 606, a decompressor component decompresses the file. For example, files that are compressed using well-known compression algorithms can be decompressed.

At 608, an extractor component performs a generic string pattern (e.g., regular expression (REGEX) extraction from the binary file).

At 610, a parser component parses the content associated with the sample, such as associated session information, file name, and/or a Uniform Resource Locator (URL) (e.g., if the sample was downloaded from a web site during a user browsing session).

At 612, a file parser component parses the language and file type associated with the sample (e.g., using a Golang package implemented parser).

At 614, a code signature matching component applies predefined code signatures to determine if the sample matches any such predefined code signatures. For example, the code signatures that are applied can be generated as similarly described above with respect to FIGS. 3 and 4.

Various use cases for identifying vulnerabilities in binary files using a code signature will now be described below. Use Cases for Identifying Vulnerabilities in Binary Files Using a Code Signature As similarly discussed above, vulnerabilities in software are a prevalent problem. For example, commonly used open source components (e.g., libraries) often have vulnerabilities and are integrated in vast types of commercial software used by enterprises. Based on our recent research related to OpenSSL, we crawled 554 related samples (openssl, libssl.so, libcrypto.so): associated 80 CVEs; totally 696 unique customers, 23,269 sessions, 6,721 uploads; for the latest buffer overflow vulnerabilities CVE-2022-3602 (OpenSSL 3.0); and Ubuntu distributed: 55 customers, 220 sessions, 16 uploads.

FIG. 7A illustrates an example detection of CVE-2018_1000121 in libcurl in accordance with some embodiments. A NULL pointer dereference exists in curl 7.21.0 up to and including curl 7.58.0 in the LDAP code (https://nvd.nist.gov/vuln/detail/CVE-2018-1000121). The function ldap_get_attribute_ber( ) is called to get attributes, but it turns out that it can return LDAP_SUCCESS and could return a NULL pointer in the result pointer (https://curl.se/docs/CVE-2018-1000121.html). The bug is only present in curl versions built to use OpenLDAP. A patch was made in curl version 7.59.0 to function ldap_recv, and curl checks the pointer properly before using it.

FIG. 7B illustrates an example code signature generation for automated detection of CVE-2018_1000121 in libcurl in accordance with some embodiments. The libcurl.so.4 distributed by Ubuntu 18.0.4 has CVE-2018_1000121 that is verified. As shown at 702, disassembly of the function at 0x46170 in the binary/usr/lib/x86_64-linux-gnu/libcurl.so.4 is performed. As shown at 704, the vulnerable function is at 0x46170. Automatically wildcarding constants in the instruction byte encodings is then performed. In this example, the vulnerable code encoding becomes {E8 ?? ?? ?? ?? 85 C0 0F 85 ?? ?? ?? ??}. A YARA rule is then automatically generated to provide the code signature with 65 wildcarded byte sequences and the condition is 52 of them.

FIG. 7C illustrates a validation of the example code signature generated for automated detection of CVE-2018_1000121 in libcurl in accordance with some embodiments. The code signature generated as described above with respect to FIG. 7B is validated based on application to various samples from VirusTotal (VT). As shown at 712, the code signature resulted in matches with 21 samples (e.g., VT RetroHunt hit 21 samples). In this signature validation, only three of them have meaningful file names mentioning libcurl.so.4. However, all of them have "7.58.0" and "libcurl" strings in the binaries.

FIG. 7D illustrates a validation of the example code signature generated for automated detection of CVE-2018_1000121 in libcurl that covers multiple versions of the libcurl software in accordance with some embodiments. As further shown in FIG. 7D, the code signature can be applied to multiple versions of the relevant software (e.g., libcurl in this example). Noise of function changes in the vulnerable range. This CVE was patched in version 7.59.0. The function changed at the following versions: 7.50.0, 7.45.0, 7.40.0, 7.33.0, 7.22.0, 7.21.7, 7.21.5, 7.21.3, and 7.21.2. The vulnerability was introduced at version 7.21.0. Versions built with same configuration included the following versions: 7.59.0, 7.58.0, 7.57.0, 7.56.1, 7.56.0, 7.49.1, 7.45.0, 7.40.0, 7.39.0. As such, the above-described generated code signature (i.e., ldap_recv signature) includes coverage for the following versions: 7.58.0 ldap_recv signature with 100% matching can detect 7.58.0, 7.57.0, 7.56.1, and 7.56.0; 7.58.0 ldap_recv signature with 80% matching can detect 7.58.0, 7.57.0, 7.56.1, 7.56.0, 7.49.1, and 7.45.0; and 7.58.0 ldap_recv signature with 40% matching can detect 7.59.0, 7.58.0, 7.57.0, 7.56.1, 7.56.0, 7.49.1, 7.45.0, 7.40.0, and 7.39.0. Moreover, the code signature can be adjusted for matching criteria, and the rule set for false positive (FP) control.

Additional example process embodiments for identifying vulnerabilities in binary files using a code signature will now be further described below.

Figure 8:
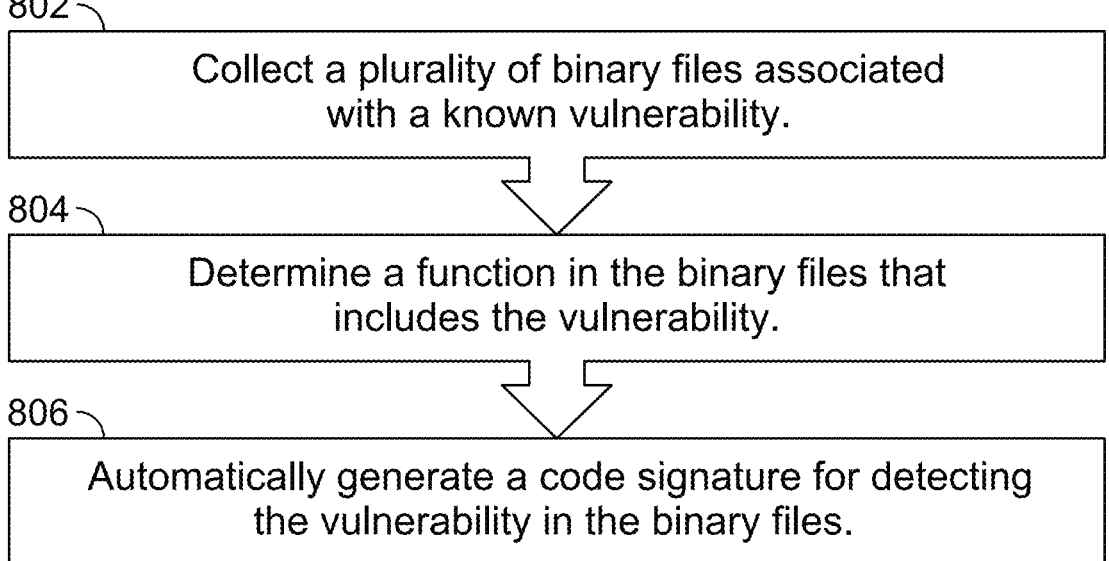
FIG. 8 is a flow diagram for identifying vulnerabilities in binary files using a code signature in accordance with some embodiments.

Process Embodiments for Identifying Vulnerabilities in Binary Files Using a Code Signature FIG. 8 is a flow diagram for identifying vulnerabilities in binary files using a code signature in accordance with some embodiments. In some embodiments, a process as shown in FIG. 8 is performed by a security entity, such as a security platform/NGFW (e.g., associated with a cloud security service), and techniques as similarly described above including the embodiments described above with respect to FIGS. 3-7C.

At 802, collecting a plurality of binary files associated with a known vulnerability is performed, such as similarly described above with respect to FIGS. 3-7C.

At 804, determining a function in the binary files that includes the vulnerability is performed, which can be implemented as similarly described above with respect to FIGS. 3-7C.

At 806, automatically generating a code signature (e.g., including wildcarding one or more instructions of the function) for detecting the vulnerability in the binary files is performed as similarly described above with respect to FIGS. 3-7C. For example, the code signature can be implemented as a YARA rule as similarly described above.

Figure 9:
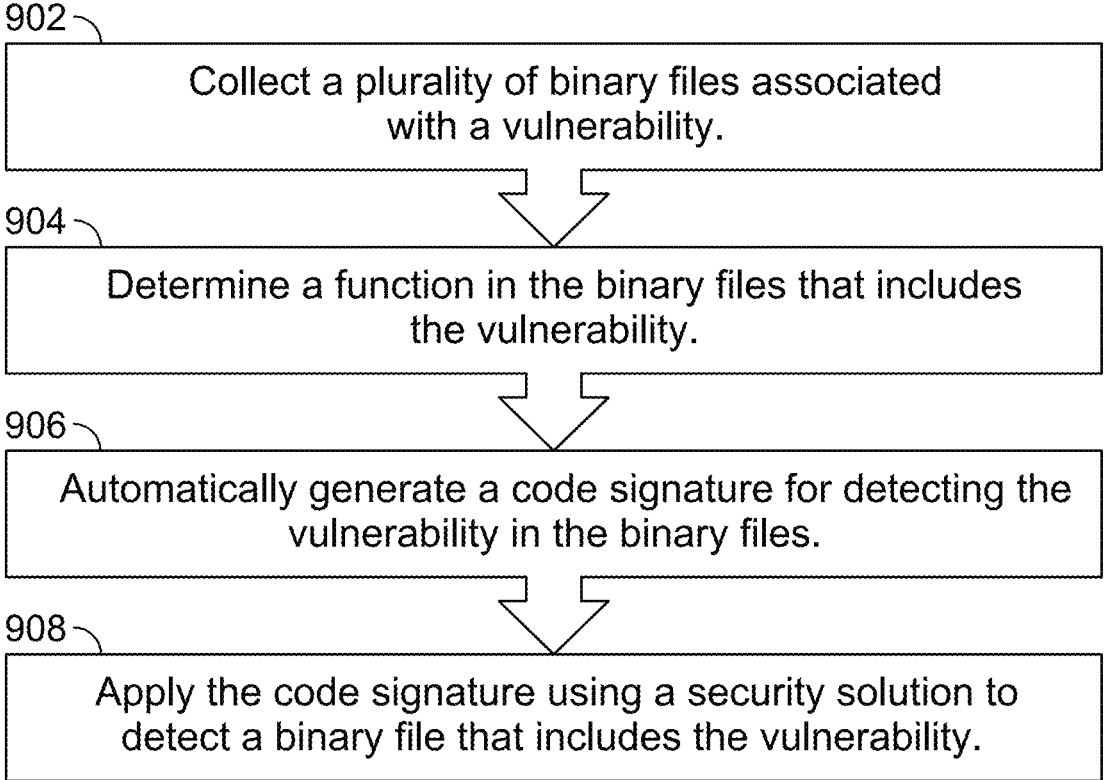
FIG. 9 is a flow diagram for identifying vulnerabilities in binary files using a code signature in accordance with some embodiments.

FIG. 9 is a flow diagram for identifying vulnerabilities in binary files using a code signature in accordance with some embodiments. In some embodiments, a process as shown in FIG. 9 is performed by a security entity, such as a security platform/NGFW (e.g., associated with a cloud security service), and techniques as similarly described above including the embodiments described above with respect to FIGS. 3-7C.

At 902, collecting a plurality of binary files associated with a known vulnerability is performed, such as similarly described above with respect to FIGS. 3-7C.

At 904, determining a function in the binary files that includes the vulnerability is performed, which can be implemented as similarly described above with respect to FIGS. 3-7C.

At 906, automatically generating a code signature (e.g., including wildcarding one or more instructions of the function) for detecting the vulnerability in the binary files is performed as similarly described above with respect to FIGS. 3-7C. For example, the code signature can be implemented as a YARA rule as similarly described above.

At 908, the code signature is applied using a security solution to detect a binary file that includes the vulnerability, such as similarly described above with respect to FIGS. 3-7C. A security policy/rule can be enforced based on a match with the code signature to perform a responsive action (e.g., alert, block, quarantine, report, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
   collect a plurality of binary files associated with a vulnerability;
   determine a function in at least one binary file of the plurality of binary files that includes the vulnerability, comprising to determine function information associated with the function, wherein the function information includes at least one of the following: a function name and/or a function address;
   determine a location of a function boundary of the function based on the function information, comprising to:
   A) in the event that the function information includes the function name:
      search the function name in a symbol table to obtain search results; and
      disassemble the at least one binary file to determine the location of the function boundary based on the search results; and/or
   B) in the event that the function information includes the function address, disassemble the at least one binary file starting from the function address to determine the location of the function boundary in the at least one binary file; and
   automatically generate, based on the location of the function boundary, a code signature for detecting the vulnerability in the plurality of binary files; and
a memory coupled to the processor and configured to provide the processor with instructions.

2. The system of claim 1, wherein the code signature is a pattern-based rule.

3. The system of claim 1, wherein the code signature is a Yet Another Recursive Acronym (YARA).

4. The system of claim 1, wherein generating the code signature for detecting the vulnerability in the plurality of binary files includes wildcarding one or more instructions of the function.

5. The system of claim 1, wherein the code signature is validated.

6. The system of claim 1, wherein the processor is further configured to:
apply the code signature using a security solution for detecting the vulnerability.

7. The system of claim 1, wherein the processor is further configured to:
apply the code signature using a security solution for detecting the vulnerability; and
perform an action in response to a match with another binary file with the code signature based on a security policy.

8. A method, comprising:
collecting a plurality of binary files associated with a vulnerability;
determining a function in at least one binary file of the plurality of binary files that includes the vulnerability, comprising to determine function information associated with the function, wherein the function information includes at least one of the following: a function name and/or a function address;
determining a location of a function boundary of the function based on the function information, comprising:
A) in the event that the function information includes the function name:
   searching the function name in a symbol table to obtain search results; and
   disassembling the at least one binary file to determine the location of the function boundary based on the search results; and/or
B) in the event that the function information includes the function address, disassembling the at least one binary file starting from the function address to determine the location of the function boundary in the at least one binary file; and automatically generating, based on the location of the function boundary, a code signature for detecting the vulnerability in the plurality of binary files.

9. The method of claim 8, wherein the code signature is a pattern-based rule.

10. The method of claim 8, wherein the code signature is a Yet Another Recursive Acronym (YARA).

11. The method of claim 8, wherein generating the code signature for detecting the vulnerability in the plurality of binary files includes wildcarding one or more instructions of the function.

12. The method of claim 8, wherein the code signature is validated.

13. The method of claim 8, further comprising:

applying the code signature using a security solution for detecting the vulnerability.

14. The method of claim 8, further comprising:

applying the code signature using a security solution for detecting the vulnerability; and performing an action in response to a match with another binary file with the code signature based on a security policy.

15. A computer program product embodied in a non-transitory computer readable medium and comprising computer instructions for:

collecting a plurality of binary files associated with a vulnerability;

determining a function in at least one binary file of the plurality of binary files that includes the vulnerability, comprising to determine function information associated with the function, wherein the function information includes at least one of the following: a function name and/or a function address;

determining a location of a function boundary of the function based on the function information, comprising:

A) in the event that the function information includes the function name:

searching the function name in a symbol table to obtain search results; and disassembling the at least one binary file to determine the location of the function boundary based on the search results; and/or B) in the event that the function information includes the function address, disassembling the at least one binary file starting from the function address to determine the location of the function boundary in the at least one binary file; and automatically generating, based on the location of the function boundary, a code signature for detecting the vulnerability in the plurality of binary files.

16. The computer program product of claim 15, wherein the code signature is a pattern-based rule.

17. The computer program product of claim 15, wherein the code signature is a Yet Another Recursive Acronym (YARA).

18. The computer program product of claim 15, wherein the code signature is validated.

19. The computer program product of claim 15, further comprising computer instructions for:

applying the code signature using a security solution for detecting the vulnerability.

20. The computer program product of claim 15, further comprising computer instructions for:

applying the code signature using a security solution for detecting the vulnerability; and performing an action in response to a match with another binary file with the code signature based on a security policy.

* * * * *